US011042588B2

(12) United States Patent
Liu

(10) Patent No.: US 11,042,588 B2
(45) Date of Patent: Jun. 22, 2021

(54) APPARATUS, METHOD, AND COMPUTER PROGRAM PRODUCT FOR VIDEO ENHANCED PHOTO BROWSING

(71) Applicant: Nokia Technologies Oy, Espoo (FI)

(72) Inventor: Yingfei Liu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 209 days.

(21) Appl. No.: 15/304,716

(22) PCT Filed: Apr. 24, 2014

(86) PCT No.: PCT/CN2014/076137
§ 371 (c)(1),
(2) Date: Oct. 17, 2016

(87) PCT Pub. No.: WO2015/161487
PCT Pub. Date: Oct. 29, 2015

(65) Prior Publication Data
US 2017/0046053 A1 Feb. 16, 2017

(51) Int. Cl.
*G06F 16/74* (2019.01)
*G06F 16/78* (2019.01)
(Continued)

(52) U.S. Cl.
CPC ........ *G06F 16/739* (2019.01); *G06F 3/04842* (2013.01); *G06F 16/74* (2019.01);
(Continued)

(58) Field of Classification Search
CPC ......... G06F 17/30843; G06F 17/30855; G06F 17/30852; G06F 17/30846; G06F 3/04842;
(Continued)

(56) References Cited

U.S. PATENT DOCUMENTS 5,963,203 A * 10/1999 Goldberg ............ G11B 27/034
715/723
6,307,550 B1 * 10/2001 Chen ..................... G06T 3/4053
345/418
(Continued)

FOREIGN PATENT DOCUMENTS

CN 103268323 A 8/2013
JP 2002259454 A 9/2002
(Continued)

OTHER PUBLICATIONS

International Search Report and Written Opinion received for corresponding Patent Cooperation Treaty Application No. PCT/CN2014/076137, dated Jan. 14, 2015,12 pages.

*Primary Examiner* — Justin R. Blaufeld
(74) *Attorney, Agent, or Firm* — Mintz Levin Cohn Ferris Glovsky and Popeo, P.C.

(57) ABSTRACT

Mechanisms are described for enhancing a user's photo browsing experience by presenting one or more video clips associated with an area of the photo that the user is viewing. For example, a pre-recorded still image may be presented on a display, and the still image may be associated with a pre-recorded video. One or more video clips of interest may be defined from the pre-recorded video and associated with a viewable area of the pre-recorded still image, e.g., a zoomed-in portion of the pre-recorded video. Receipt of a user input via the zoomed-in portion may cause presentation of a video clip of interest that is associated with the zoomed-in portion. The video clip of interest may, for example be a portion of the pre-recorded video in which an evens occurs, such as a gesture or a laugh or a smile of one of the participants in the scene being captured.

15 Claims, 9 Drawing Sheets

(51) Int. Cl.
*G06F 3/0484* (2013.01)
*G06K 9/00* (2006.01)
*G06F 16/738* (2019.01)
*G06F 16/732* (2019.01)
*G11B 27/10* (2006.01)

(52) U.S. Cl.
CPC .......... *G06F 16/745* (2019.01); *G06F 16/748* (2019.01); *G06K 9/00228* (2013.01); *G06K 9/00718* (2013.01); *G06F 16/7328* (2019.01); *G06F 16/78* (2019.01); *G06K 2009/00738* (2013.01); *G11B 27/102* (2013.01)

(58) Field of Classification Search
CPC ...... G06F 16/739; G06F 16/74; G06F 16/745; G06F 16/748; G06F 16/7328; G06F 16/78; G06K 9/00718; G06K 9/00228; G06K 2009/00738; G11B 27/102
See application file for complete search history.

(56) References Cited

U.S. PATENT DOCUMENTS

| | | | |
|---|---|---|---|
| 2003/0234805 A1* | 12/2003 | Toyama | H04N 21/440263 715/723 |
| 2004/0221322 A1* | 11/2004 | Shen | G06F 16/745 725/135 |
| 2005/0081138 A1* | 4/2005 | Voss | H04N 21/84 715/200 |
| 2006/0072847 A1* | 4/2006 | Chor | H04N 1/3875 382/282 |
| 2006/0156228 A1* | 7/2006 | Gallo | G06F 3/04842 715/202 |
| 2006/0210165 A1* | 9/2006 | Takemoto | H04N 5/91 382/190 |
| 2007/0237225 A1* | 10/2007 | Luo | H04N 19/527 375/240.12 |
| 2009/0003712 A1* | 1/2009 | Mei | G06F 16/739 382/225 |
| 2009/0300475 A1* | 12/2009 | Fink | H04N 21/4781 715/230 |
| 2010/0002070 A1* | 1/2010 | Ahiska | H04N 5/232945 348/36 |
| 2010/0104261 A1* | 4/2010 | Liu | G11B 27/34 386/241 |
| 2011/0035054 A1* | 2/2011 | Gal | G05D 1/0038 700/258 |
| 2011/0227857 A1 | 9/2011 | Chaudhri | |
| 2011/0316884 A1* | 12/2011 | Giambalvo | G06F 16/44 345/660 |
| 2012/0198319 A1* | 8/2012 | Agnoli | G11B 27/34 715/202 |
| 2013/0067391 A1* | 3/2013 | Pittappilly | G06F 3/0482 715/784 |
| 2013/0069990 A1* | 3/2013 | Geise | G06F 3/04847 345/660 |
| 2013/0091432 A1* | 4/2013 | Shet | G06F 16/532 715/719 |
| 2013/0229484 A1* | 9/2013 | Furumura | H04N 5/232 348/36 |
| 2013/0298083 A1* | 11/2013 | Bertoldo | G06F 3/0482 715/835 |
| 2013/0315445 A1* | 11/2013 | Schlieski | H04N 21/41407 382/103 |
| 2014/0226052 A1* | 8/2014 | Kang | H04N 5/23296 348/333.02 |
| 2014/0281868 A1* | 9/2014 | Vogel | G06F 3/04883 715/212 |
| 2015/0249794 A1* | 9/2015 | Furumura | H04N 13/156 348/36 |

FOREIGN PATENT DOCUMENTS

| | | |
|---|---|---|
| JP | 2012080431 | 4/2012 |
| JP | 2014050022 A | 3/2014 |
| JP | 2014050022 A | 3/2014 |

\* cited by examiner

APPARATUS, METHOD, AND COMPUTER PROGRAM PRODUCT FOR VIDEO ENHANCED PHOTO BROWSING

RELATED APPLICATION

This application was originally filed as Patent Cooperation Treaty Application No. PCT/CN2014/076137 filed Apr. 24, 2014

TECHNOLOGICAL FIELD

Example embodiments of the present invention relate generally to mechanisms for enhancing a user's experience when viewing images on a user device, such as photographs.

BACKGROUND

With the proliferation of mobile devices, users are recording more and more digital images of the people and places around them. These digital images may be accessible to users via their user devices. As a result, users may spend significant amounts of time browsing previously recorded images to find a particular image to use, select an image to share, or simply to reminisce.

BRIEF SUMMARY OF EXAMPLE EMBODIMENTS

Accordingly, it may be desirable to provide tools that allow users to have a fuller and more satisfying experience when browsing through previously-recorded images on the user's user device, such as when looking through still images in the user's photo gallery. In this regard, embodiments of the invention described herein provide mechanisms for providing a brief video clip of interest that is related to a still image being viewed and presents further information or context regarding the browsed scene.

An apparatus may thus be provided that includes at least one processor and at least one memory including computer program code. The at least one memory and the computer program code may be configured to, with the at least one processor, cause the apparatus at least to cause presentation of a pre-recorded still image on a display, wherein the pre-recorded still image is associated with a pre-recorded video. The at least one memory and the computer program code may be further configured to, with the at least one processor, cause the apparatus to cause presentation of a zoomed-in portion of the pre-recorded still image on the display upon receipt of a first user input and to cause presentation of a video clip of interest associated with the zoomed-in portion of the pre-recorded still image upon receipt of a second user input via the zoomed-in portion of the pre-recorded still image, where the video clip of interest is a portion of the pre-recorded video in which an event occurs.

In some cases, the at least one memory and the computer program code may be further configured to, with the at least one processor, cause the apparatus to cause presentation of a first video clip of interest and a second video clip of interest in an instance in which the zoomed-in portion of the pre-recorded still image is associated with the first video clip of interest and with the second video clip of interest. In an instance in which the zoomed-in portion of the pre-recorded still image that is presented corresponds to a total captured area of the pre-recorded still image, the at least one memory and the computer program code may be further configured to, with the at least one processor, cause the apparatus to cause presentation of the pre-recorded video.

The video clip of interest may comprise a portion of a total captured area of the pre-recorded video. Additionally or alternatively, the video clip of interest may comprise a portion of a total duration of the pre-recorded video.

In some embodiments, the event may comprise a detected motion in the pre-recorded video meeting a predefined criterion. The pre-defined criterion may be configurable by the user. The pre-recorded video may be captured automatically prior to capture of the pre-recorded still image. In some cases, the second user input may comprise a double tap gesture.

In other embodiments, a method and a computer program product are described that cause presentation of a pre-recorded still image on a display, wherein the pre-recorded still image is associated with a pre-recorded video; cause presentation of a zoomed-in portion of the pre-recorded still image on the display upon receipt of a first user input; and cause presentation of a video clip of interest associated with the zoomed-in portion of the pre-recorded still image upon receipt of a second user input via the zoomed-in portion of the pre-recorded still image, wherein the video clip of interest is a portion of the pre-recorded video in which an event occurs.

In some cases, causing presentation of the video clip of interest may comprise causing presentation of a first video clip of interest and a second video clip of interest in an instance in which the zoomed-in portion of the pre-recorded still image is associated with the first video clip of interest and with the second video clip of interest. Moreover, in an instance in which the zoomed-in portion of the pre-recorded still image that is presented corresponds to a total captured area of the pre-recorded still image, causing presentation of the video clip of interest may comprise causing presentation of the pre-recorded video. The video clip of interest may comprise a portion of a total captured area of the pre-recorded video and/or the video clip of interest may comprise a portion of a total duration of the pre-recorded video.

In some cases, the event may comprise a detected motion in the pre-recorded video meeting a predefined criterion. The pre-defined criterion may be configurable by the user. Furthermore, the pre-recorded video may be captured automatically prior to capture of the pre-recorded still image. In some cases, the second user input may comprise a double tap gesture.

In other embodiments, a computer program product is provided that comprises at least one non-transitory computer-readable storage medium having computer-executable program code portions stored therein. The computer-executable program code portions may comprise program code instructions for causing an apparatus to perform a method according to any of the steps described above.

In still other embodiments, an apparatus is provided that comprises means for performing a method according to any of the steps described above.

In still other embodiments, an apparatus is provided for presenting a video clip of interest. The apparatus may include means for causing presentation of a pre-recorded still image on a display, wherein the pre-recorded still image is associated with a pre-recorded video; means for causing presentation of a zoomed-in portion of the pre-recorded still image on the display upon receipt of a first user input; and means for causing presentation of a video clip of interest associated with the zoomed-in portion of the pre-recorded still image upon receipt of a second user input via the zoomed-in portion of the pre-recorded still image, wherein the video clip of interest is a portion of the pre-recorded video in which an event occurs.

BRIEF DESCRIPTION OF THE SEVERAL VIEWS OF THE DRAWING(S)

Having thus described example embodiments of the invention in general terms, reference will now be made to the accompanying drawings, which are not necessarily drawn to scale, and wherein:

Figure 4:
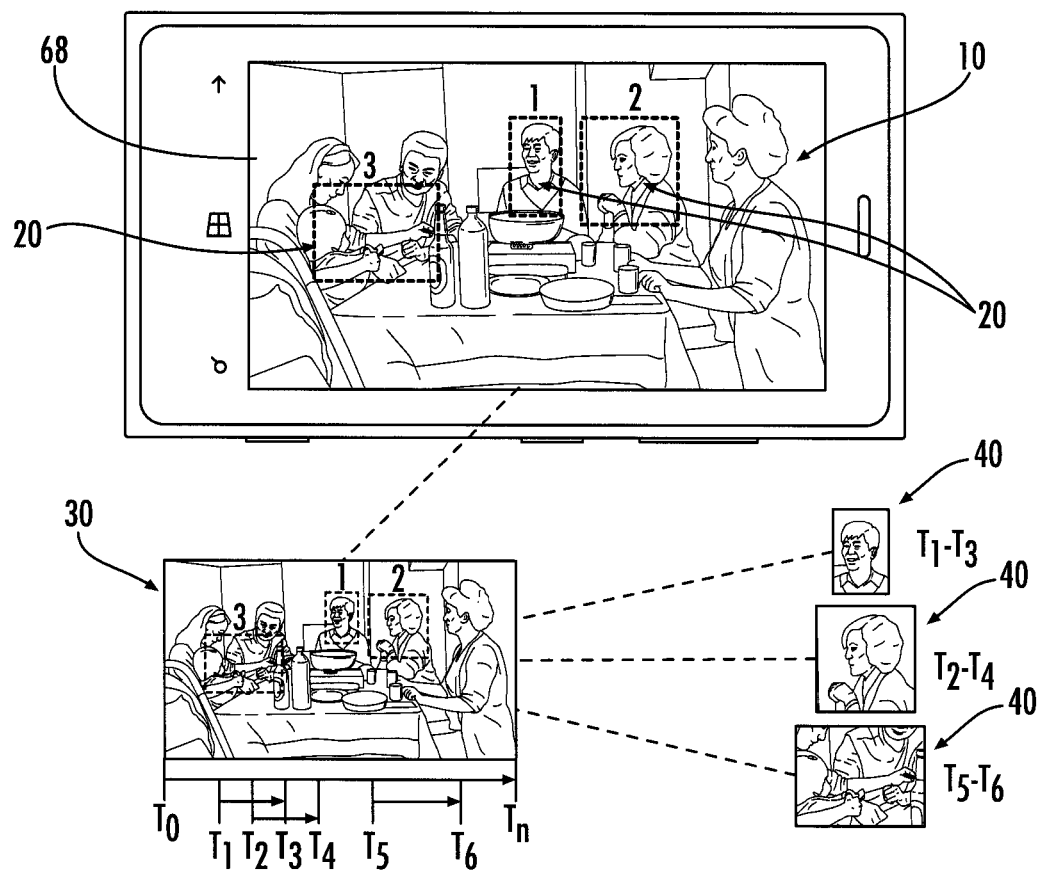
FIG. 4 illustrates the user device of FIG. 3 presenting on its display a pre-recorded still image with an associated pre-recorded video and three video clips of interest corresponding to the three depicted viewable areas according to an example embodiment of the present invention.
Figure 7:
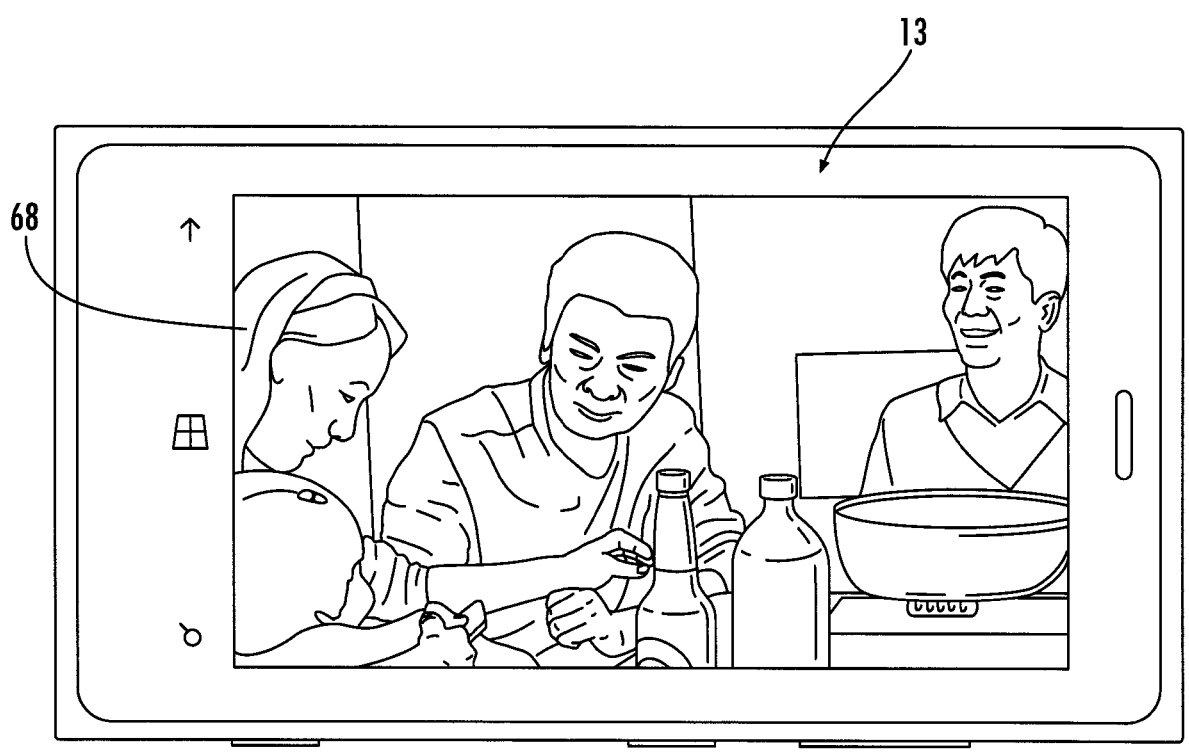
FIG. 7 illustrates another example of a zoomed in portion of the image presented on the user device of FIG. 4 according to another example embodiment of the present invention.
Figure 8:
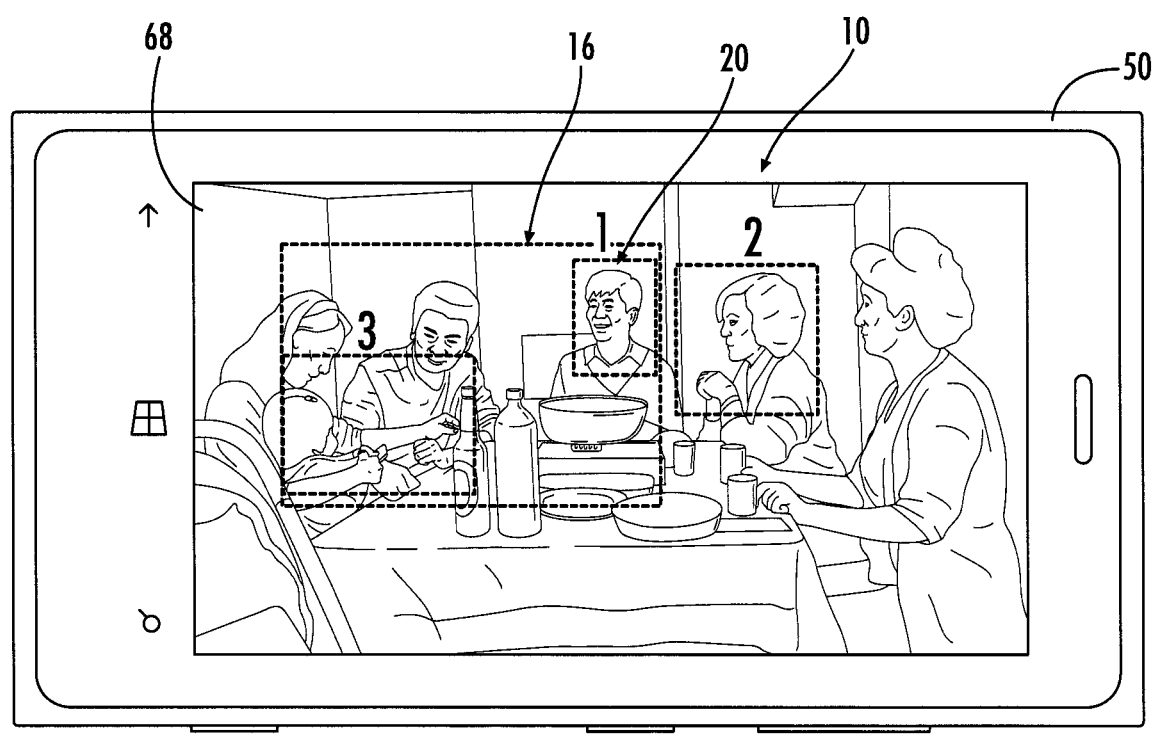
Figure 9:
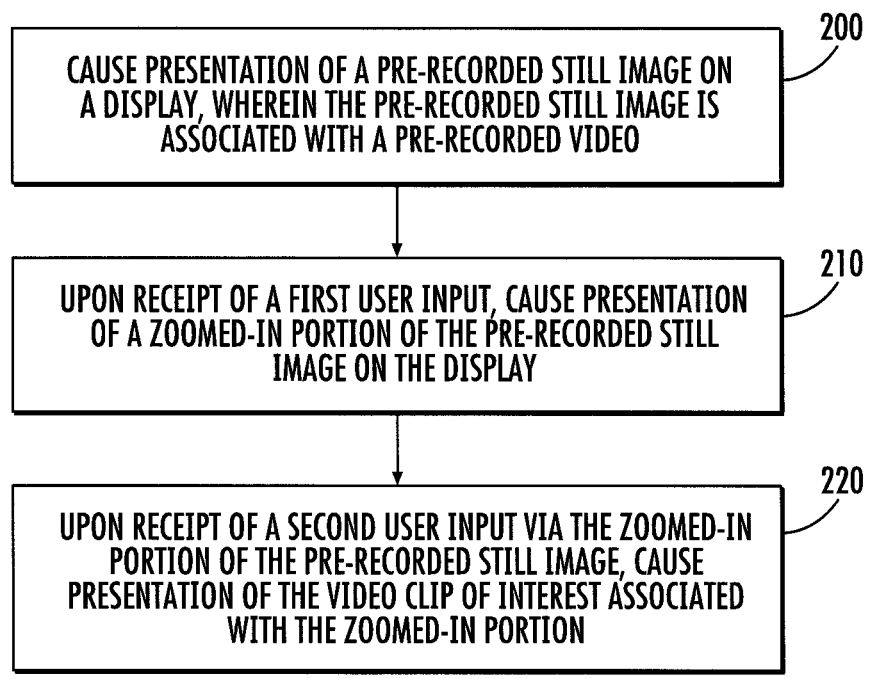

FIG. 8 illustrates the determination of an area being presented in the zoomed in image of FIG. 7 with respect to the original image of FIG. 4 for determining video clips associated with the encompassed viewable areas according to an example embodiment of the present invention; and FIG. 9 illustrates a flowchart of methods of causing presentation of a video clip associated with a zoomed-in portion of a still image according to an example embodiment of the present invention.

DETAILED DESCRIPTION

Some example embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

As devices for capturing images, such as smartphones with built-in cameras and video recorders, become more prevalent, users are capturing more images and are receiving images captured by other users, such as via text messaging, email, social networking websites, etc. In turn, users are also spending more time accessing images that were previously captured and stored for viewing. Users may spend a significant amount of time perusing numerous pre-recorded images, such as still images (e.g., photographs), either searching for a particular image to use or share or simply spending time remembering a particular person or event.

A still image, such as a photograph, captures a moment in time—it is static. The only information that the user can obtain from the image is how the people in the captured image appeared (what they were doing, what they were wearing, the expressions on their faces, etc.) at the moment the image was recorded. The few seconds that elapsed leading up to the moment the image was captured are not represented in the still image. Often, however, it is those few seconds before the still image is captured that funny words are spoken to get the participants to smile for the picture, or unexpected actions and gestures are made as the participants realize they are about to be caught "on film."

Because there may be different participants in the still image (e.g., people or animals whose picture is being taken), the participants may make any such noteworthy or interesting actions at different times. Moreover, each participant occupies a different physical space and, as such, is represented in the captured image in a different area of the 2-dimensional image.

Accordingly, embodiments of the invention described herein provide mechanisms for analyzing the content of a video recording taken just prior to the capture of a still image (e.g., recording the same scene captured in the still image) and determining one or more video clips of interest based on actions that take place in one or more areas of the scene through the duration of the video recording. The video clips may thus have a shorter duration than the pre-recorded video and may focus on a particular area or areas of the scene captured (e.g., on one of multiple participants in the scene). Embodiments of the invention may associate the video clips with the particular area involved, such that when a user is browsing the still image associated with the pre-recorded video from which the video clips are derived, receipt of a user input in an area (e.g., a zoomed-in portion of the pre-recorded still image) that is associated with a video clip causes presentation of the video clip. In this way, the user may have a richer image-viewing experience and a more complete understanding of the context of the still image being browsed through exposure to additional moments related to the still image.

Figure 1:
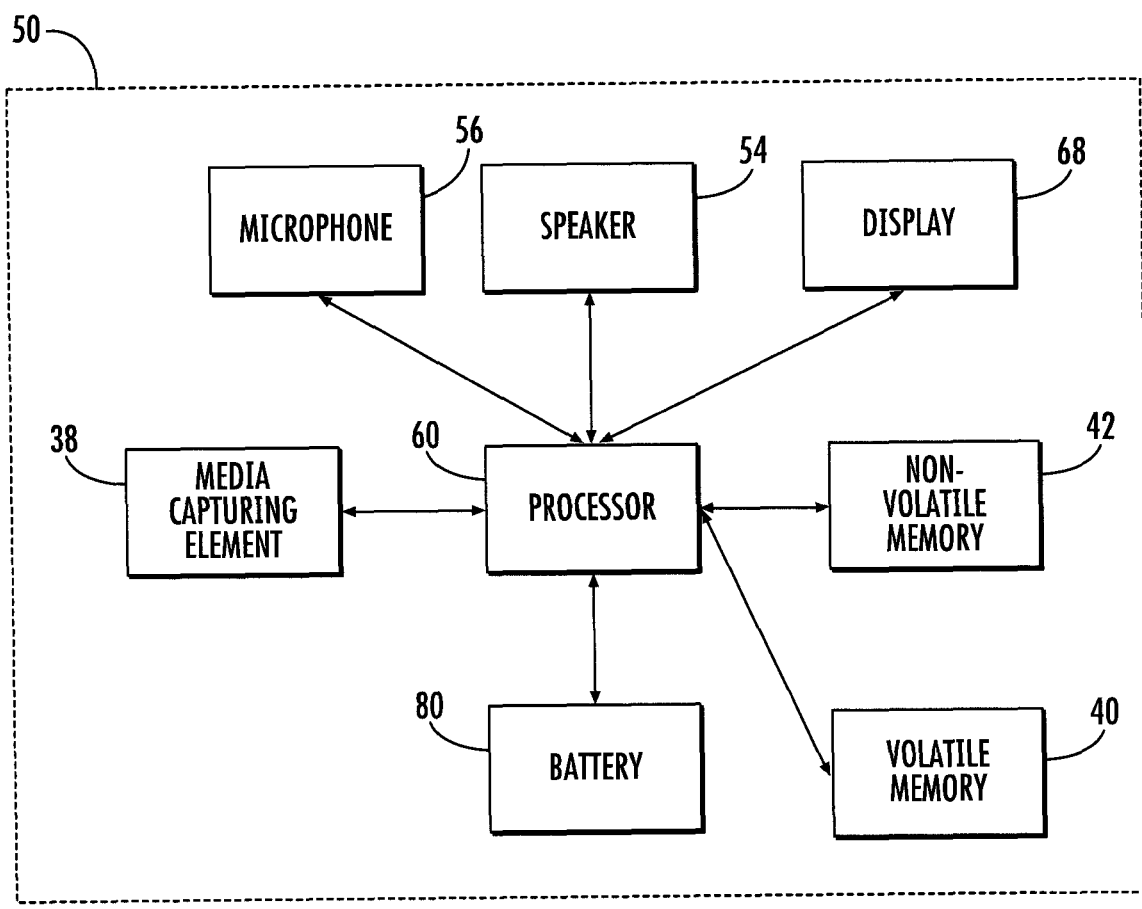
FIG. 1 illustrates a schematic block diagram of a user device for causing presentation of a video clip associated with a zoomed-in portion of a still image being viewed according to an example embodiment of the present invention.

Turning now to FIG. 1, which provides one example embodiment, a block diagram of a user device 50 that would benefit from embodiments of the present invention is illustrated. The user device 50 may be any device that is, includes, or is in communication with a camera or other media capturing element 38 or that is otherwise configured to allow previously-captured still images or video to be viewed, such as on a display 68 of the user device 50. It should be understood, however, that the user device 50 as illustrated and hereinafter described is merely illustrative of one type of device that may benefit from embodiments of the present invention and, therefore, should not be taken to limit the scope of embodiments of the present invention. For example, in some embodiments the user device 50 may be a portable digital assistant (PDA), smartphone, pager, mobile television, gaming device, laptop computer, tablet computer, touch surface, wearable device, video recorder, video player, video viewer or any combination of the aforementioned, and other types of voice and text communications systems.

Referring again to FIG. 1, the user device 50 may include a processor 60 or other processing device, which controls the functions of one or more components of the user device 50. In some embodiments, the processor 60 may include circuitry desirable for implementing audio and logic functions of the user device 50. For example, the processor 60 may be comprised of a digital signal processor device, a microprocessor device, and various analog to digital converters, digital to analog converters, and other support circuits. Control and signal processing functions of the user device 50 are allocated between these devices according to their respective capabilities. The processor 60 may include functionality to operate one or more software programs, which may be stored in memory.

The user device 50 may also comprise a user interface including an output device such as a conventional earphone or speaker 54, a microphone 56, a display 68, and a user input interface, all of which are coupled to the processor 60. The user input interface, which allows the user device 50 to receive data, may include any of a number of devices allowing the user device 50 to receive data, such as a keypad, a touch screen display (display 68 providing an example of such a touch screen display), or other input device. In embodiments including a keypad, the keypad may include the conventional numeric (0-9) and related keys (#, *), and other hard and soft keys used for operating the user device 50. Alternatively or additionally, the keypad may include a conventional QWERTY keypad arrangement. The keypad may also include various soft keys with associated functions. In addition, or alternatively, the user device 50 may include an interface device such as a joystick or other user input interface. The user device 50 may further include a battery 80, such as a vibrating battery pack, for powering various circuits that are required to operate the user device 50.

The user device 50 may further include volatile memory 40, such as volatile Random Access Memory (RAM) including a cache area for the temporary storage of data. The user device 50 may also include other non-volatile memory 42, which may be embedded and/or may be removable. The memories may store any of a number of pieces of information, and data, used by the user device 50 to implement the functions of the user device 50. Moreover, the memories may store one or more captured images, including still images and video recordings that are captured by the user device 50 or devices (e.g., a camera or another user's user device) accessible to or in communication with the user device.

It should also be noted that while FIG. 1 illustrates one example of a configuration of a user device 50 configured to present video clips of interest to a user during the user's viewing of related still images, numerous other configurations may also be used to implement embodiments of the present invention. As such, in some embodiments, although devices or elements are shown as being in communication with each other, hereinafter such devices or elements should be considered to be capable of being embodied within a same device or element and, thus, devices or elements shown in communication should be understood to alternatively be portions of the same device or element.

Figure 2:
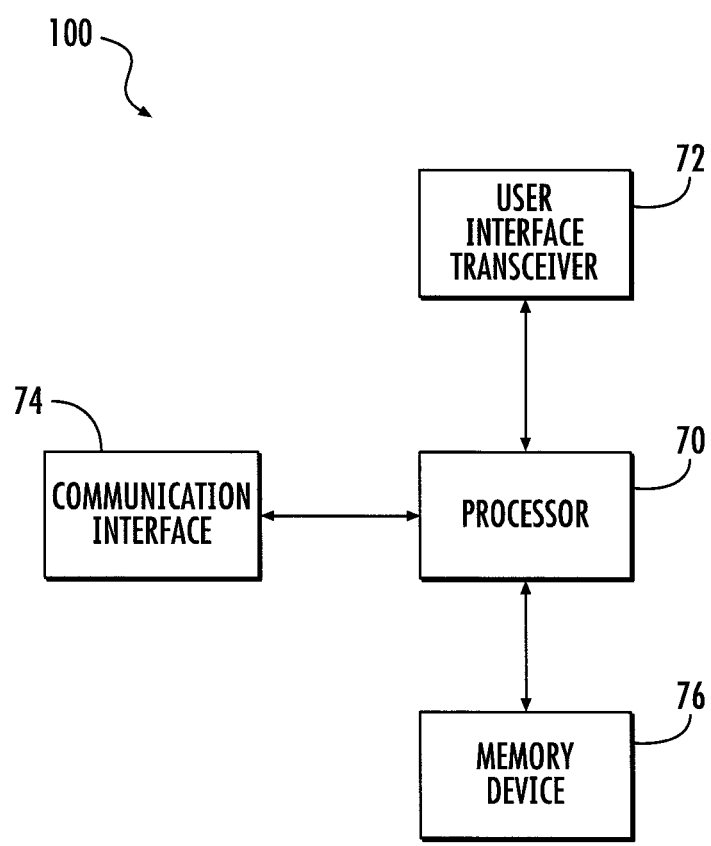
FIG. 2 illustrates a schematic block diagram of an apparatus for causing presentation of a video clip associated with a zoomed-in portion of a still image according to an example embodiment of the present invention.

With reference to FIG. 2, an apparatus 100 for causing presentation of video clips of interest to a user is shown. The apparatus 100 may, in some embodiments, be embodied by the user device 50 of FIG. 1. The apparatus 100 may include or otherwise be in communication with a processor 70 (such as the processor 60 of the user device 50 of FIG. 1), a user interface transceiver 72, a communication interface 74, and a memory device 76. In some embodiments, the processor 70 (and/or co-processors or any other processing circuitry assisting or otherwise associated with the processor 70) may be in communication with the memory device 76 via a bus for passing information among components of the apparatus 100. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, content, applications, instructions, or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70, as well as images (e.g., still and video images) captured by an image capturing device and/or alterations or modifications to the presentation of the images determined by the apparatus 100 according to embodiments of the invention described herein and/or provided by the user (e.g., cropping, zooming, panning, rotating, and/or other image modifications).

The apparatus 100 may, in some embodiments, be a user device 50 (such as the user device of FIG. 1) with image capturing capability (e.g., a smartphone), an image capturing device, or a fixed communication device or computing device configured to employ an example embodiment of the present invention. However, in some embodiments, the apparatus 100 may be embodied as a chip or chip set. In other words, the apparatus 100 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 100 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard-coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 100. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface transceiver 72 may be in communication with the processor 70 to receive an indication of a user input and/or to cause provision of an audible, visual, mechanical or other output to the user. As such, the user interface transceiver 72 may include, for example, a keyboard, a mouse, a joystick, a display, a touch screen(s), touch areas, soft keys, a microphone, a speaker, or other input/output mechanisms. For example, the user interface transceiver 72 may include or be in communication with a touch screen display (such as the touch screen display 68 of FIG. 1) that is configured to present images, such as previously captured still pictures and video images, for viewing by the user. In different example cases, the touch screen display 68 may be a two dimensional (2D) or three dimensional (3D) display. The touch screen display 68 may be embodied as any known touch screen display. Thus, for example, the touch screen display 68 could be configured to enable touch recognition by any suitable technique, such as resistive, capacitive, infrared, strain gauge, surface wave, optical imaging, dispersive signal technology, acoustic pulse recognition, and/or other techniques. The user interface transceiver 72 may be in communication with the touch screen display 68 to receive indications of user inputs at the touch screen display 68 and to modify a response to such indications based on corresponding user actions that may be inferred or otherwise determined responsive to the indications.

In this regard, various indications of user input may be received as a result of touch or proximity events at the touch screen display 68. For example, with respect to a touch event, a force indication may be received, which is indicative of the amount of force applied due to contact with the touch screen display 68. Alternatively or additionally, a position indication may be received (e.g., x-, y-coordinates) that describes the location of the contact.

The user interface transceiver 72 may be configured to recognize and/or determine a corresponding classification of a touch event, such that a touch event may be classified as any of a number of possible gestures. Some examples of recognizable gestures may include a touch, multi-touch, stroke, character, symbol, shape, pinch event (e.g., a pinch in or pinch out), and/or the like.

A touch may be defined as a touch event that impacts a single area (without or with minimal movement on the surface of the touch screen display 68) and then is removed. As such, a touch input may include a contact component (e.g., a location of the contact with the touch surface 68), a force component (e.g., an amount of force exerted by the user in applying the touch input, such as measured by force sensors in the display 68), and a duration (e.g., a length of time from when initial contact is made with the touch surface 68 until the contact is removed and the touch input ends). An example of a touch input may be a tap gesture (e.g., a single touch input applying pressure to the touch screen display 68 for a brief time, such as less than one second).

A multi-touch may be defined as multiple touch events sensed concurrently (or nearly concurrently). For example, the touch input may be a double tap gesture (e.g., rapid succession of two touch inputs, each applying pressure to the touch screen display for a brief time, such as less than one second). A stroke may be defined as a touch event followed immediately by motion of the object initiating the touch event while the object remains in contact with the touch screen display 68. In other words, the stroke may be defined by motion following a touch event thereby forming a continuous, moving touch event defining a moving series of instantaneous touch positions (e.g., as a drag operation or as a flick operation). Multiple strokes and/or touches may be used to define a particular shape or sequence of shapes to define a character or symbol.

A pinch event may be classified as either a pinch out or a pinch in. A pinch may be defined as a multi-touch, where the touch events causing the multi-touch are spaced apart. After initial occurrence of the multi-touch event involving at least two objects, one or more of the objects may move substantially toward each other to simulate a pinch (pinch in). Meanwhile, a pinch out may be defined as a multi-touch, where the touch events causing the multi-touch are relatively close together, followed by movement of the objects initiating the multi-touch substantially away from each other. In some cases, the objects on a pinch out may be so close together initially that they may be interpreted as a single touch, rather than a multi-touch, which then is modified by movement of two objects away from each other. In some embodiments, a pinch in gesture may result in an image being presented on the display being zoomed out, whereas a pinch out gesture may result in the image being zoomed in.

Alternatively or additionally, the processor 70 may comprise user interface circuitry configured to control at least some functions of one or more user interface elements such as, for example, a speaker, microphone, display, and/or the like. The processor 70 and/or user interface circuitry comprising the processor 70 may be configured to control one or more functions of one or more user interface elements through computer program instructions (e.g., software and/or firmware) stored on a memory accessible to the processor 70 (e.g., memory device 76, and/or the like).

Figure 3:
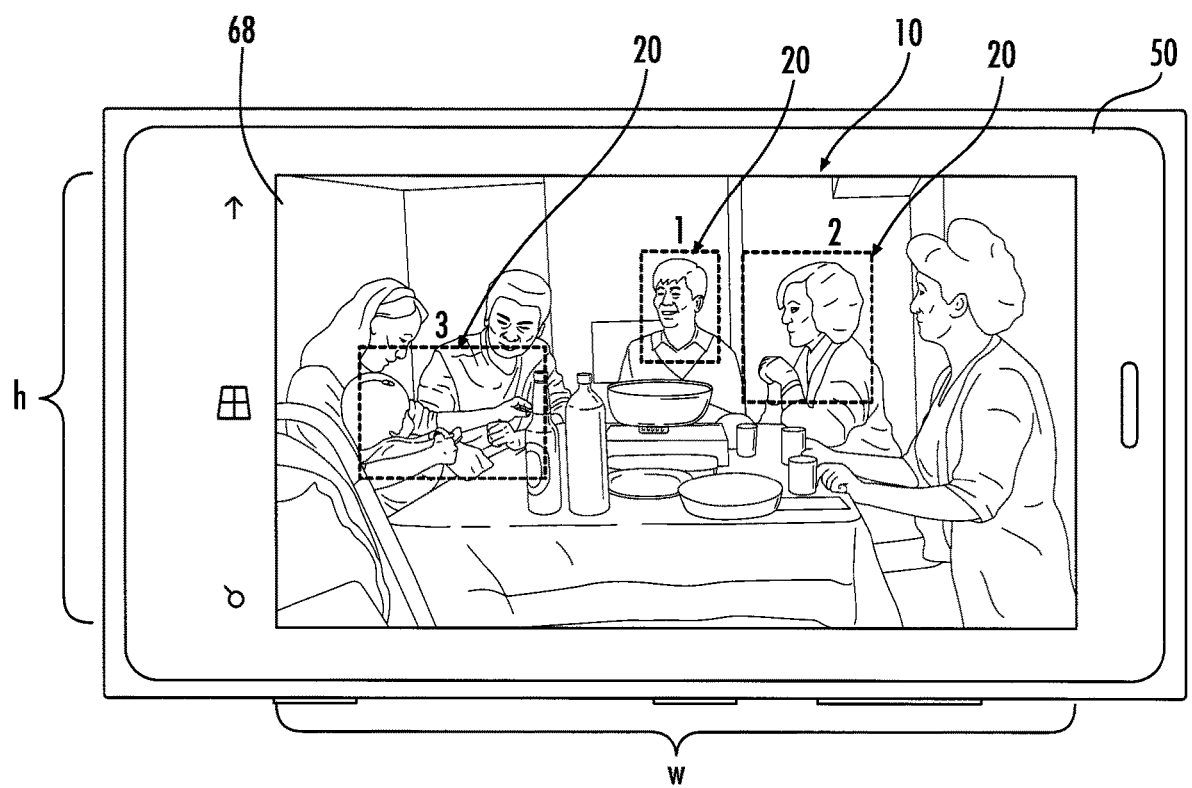
FIG. 3 illustrates a user device presenting on its display a pre-recorded still image for browsing by the user according to an example embodiment of the present invention.

Embodiments of the invention will now be described with reference to the figures. As noted above, a user device 50, such as the user device 50 shown in FIG. 1, may be configured to present an image 10 for viewing by the user, as shown in FIG. 3. The image 10 may be a still image or a video image. In the case of a video image, the visual aspects of the image 10 may be accompanied by audio aspects of the video recording presented to the user, for example, via one or more speakers of the user device, and the video image may have a certain duration (e.g., 10 seconds).

The image 10 may be presented on the display 68 of the user device 50, and the display may have a certain maximum area over which the image is viewable, typically corresponding to the area of the display screen. When a user is viewing the image 10, the user may choose to view the image in its entirety across the area of the display 68 (e.g., the area being equivalent to the width w times the height h of the display). In some cases, however, the user may wish to see a particular part of the image 10 in greater detail and may apply a touch input, such as a pinch out gesture to the display 68 to zoom in on a portion of the image. As a result of such a gesture, the area w×h of the display 68 may present a portion of the image 10 that is smaller than the entire image, but that portion may be presented at a larger aspect ratio (zoomed in).

In this regard, the image 10 may include a number of viewable areas 20 within the total area of the image that may be of interest to a user. The viewable areas 20 may be portions of the entire image 10 that show a particular participant (e.g., a participant's face), a certain action that is captured in the image (e.g., a participant laughing or clapping), or some other portion of the image that may be of particular interest to the user (e.g., being more interesting than, e.g., the background of the image).

A user viewing the image 10 may, in some cases, wish to have more information about an aspect of what is presented in the image. For example, the user may notice that one of the participants is laughing very enthusiastically in the moment captured by the image 10 and may wonder what happened in the few seconds prior to the image being captured that may have prompted such laughter.

Embodiments of the invention described below are therefore configured to provide a user with an enhanced image browsing experience by capturing a video recording at the time a still image is captured, such as a few seconds prior to the capture of the still image. Moreover, rather than showing a single video recording of the entire scene presented in the image 10 each time a user browses the associated still image, embodiments of the invention are configured to analyze the video recording and create video clips of interesting portions of the video recording that are then associated with certain viewable areas 20 of the image 10. In this way, user input provided by the user regarding a particular viewable area 20 can prompt the presentation of the video clip associated with that particular viewable area, thereby providing the user with information regarding the particular portion of the image 10 that the user is most interested in, rather than forcing the user to view a longer video recording that includes information regarding various other portions of the image in which the user may not have as much interest.

In this regard, the apparatus 100 may comprise at least one processor 70 and at least one memory 76 including computer program code, as shown in FIG. 2. With reference to FIGS. 2 and 4, the at least one memory 76 and the computer program code may be configured to, with the processor 70, cause the apparatus 100 to cause presentation of a pre-recorded still image 10 on a display 68, wherein the pre-recorded still image is associated with a pre-recorded video 30. Upon receipt of a first user input, such as a pinch-out touch gesture, the at least one memory 76 and the computer program code may be configured to, with the processor 70, cause presentation of a zoomed-in portion of the pre-recorded still image on the display. Upon receipt of a second user input via the zoomed-in portion of the pre-recorded still image, as described in greater detail below, the at least one memory and the computer program code may be configured to, with the processor, cause the apparatus to cause presentation of a video clip of interest that is associated with the zoomed-in portion of the pre-recorded still image, wherein the video clip of interest is a portion of the pre-recorded video in which an event occurs.

In some embodiments, for example, the apparatus 100 may be caused to define at least one video clip of interest 40 from the pre-recorded video 30, and the at least one video clip of interest may thus be a portion of the pre-recorded video. The zoomed-in portion of the pre-recorded still image may be or may encompass a viewable area 20 of the pre-recorded still image and may, in turn, be associated with a video clip of interest 40. Thus, in some cases, the apparatus 100 may be caused to determine an area of the pre-recorded still image that is presented on the display 68 (e.g., the zoomed-in portion). In an instance in which the zoomed-in portion presented is associated with a video clip of interest 40 (e.g., where the zoomed-in portion comprises the viewable area 20), the at least one memory and the computer program code may be configured to, with the processor, cause the apparatus to cause presentation of the video clip of interest.

With reference to FIG. 4, for example, a video recording 30 may be captured within a relatively short time frame prior to the capture of a still image 10. In some embodiments, the pre-recorded video may be captured in response to user input instructing the capture of the video, whereas in other cases the video may be captured automatically prior to capture of the pre-recorded still image. For example, a user who is using his user device 50 to capture a still image 10 of his family celebrating his nephew's first birthday may actuate a button on the user device to focus the image about to be captured and then capture the image. Upon recognizing that the user intends to capture a still image 10 of the scene being viewed via the display 68 (e.g., through receipt of the first actuation of the button to focus the image about to be captured), at time $T_0$, for example, the user device 50 may begin recording a video of the scene. The video recording may be ceased when the still image is captured at time $T_n$. In the depicted example, the duration of the video recording 30 may be $T_0$-$T_n$, as depicted in FIG. 4.

In some embodiments, the apparatus may be configured to, via the processor, analyze the content of the video recording to identify parts of the video recording that include certain events that may be of particular interest to the user. The video clips 40 may be defined, for example, based on an event such as a detected motion in the pre-recorded video meeting a pre-defined criterion. For example, the apparatus may be configured to identify if and when a participant in the scene smiles, if and when a large gesture occurs (e.g., when a participant raises their arms above their head in excitement), if and when a fast motion occurs (e.g., one participant waves or pats another participant on the back), etc. The pre-defined criterion may, in some cases be configurable by the user, such as through set-up options of the user device 50 or of an application executed by the user device. In any case, such identified events within the pre-recorded video may be extracted and stored as distinct video clips 40 that are associated with the viewable areas 20 and/or zoomed-in portion in which they occur.

For example, in FIG. 4, an analysis of the pre-recorded video 30 may identify three noteworthy events and may, in turn, define three video clips of interest 40. In one viewable area 20 (labeled "1" in the still image for explanatory purposes), the user's brother-in-law (a participant in the captured scene) smiles from time $T_1$-$T_3$ (e.g., from 1 second to 3 seconds along the timeline of the pre-recorded video, which may be, for example, a total of 10 seconds long). In another viewable area 20 (labeled "2"), the user's sister smiles from time $T_2$-$T_4$ (e.g., from 2 seconds to 4 seconds along the timeline of the pre-recorded video). In the third viewable area 20 identified (labeled "3"), the user's nephew claps his hands from time $T_5$-$T_6$ (e.g., from 6 seconds to 8 seconds along the timeline of the pre-recorded video). These identified events may thus, in some embodiments, be extracted from the full pre-recorded video and stored as video clips 40 that are associated with the corresponding viewable areas 20.

Accordingly, in some embodiments, one or more of the video clips of interest 40 may comprise a portion of a total duration of the pre-recorded video 30 (e.g., the video clip may be shorter than the pre-recorded video). Additionally or alternatively, one or more of the video clips of interest 40 may comprise a portion of a total captured area of the pre-recorded video 30. For example, as shown in FIG. 4, the event triggering the defining of a video clip 40 (e.g., the smiling of the user's brother-in-law) may occur in only a portion of the total area of the captured scene shown in the video recording (e.g., where the total captured area corresponds to the total area of the display, or w×h as shown in FIG. 3, and the area of the event triggering the video corresponds to a particular viewable area 20). Thus, in some embodiments, the video clip 40 may provide a smaller portion of the total captured area of the pre-recorded video focusing on the event of interest, rather than presenting the whole scene captured in the pre-recorded video (which may include areas in which nothing of interest is happening over the timeframe captured).

Figure 5:
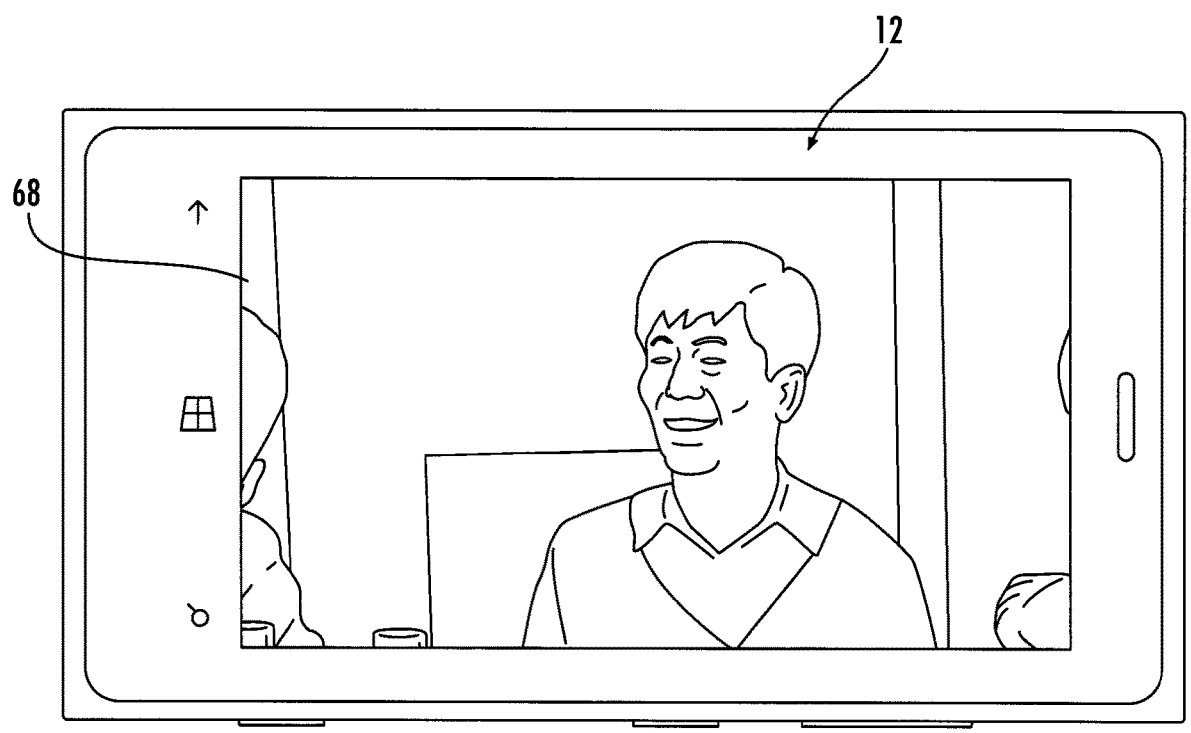
FIG. 5 illustrates a zoomed in portion of the image presented on the user device of FIG. 4 according to an example embodiment of the present invention.

Turning to FIGS. 4 and 5, the user may be looking at the still image 10 shown in FIG. 4 and may wish to zoom in on his brother-in-law (shown in viewable area "1") to see in more detail what his brother-in-law was doing. The user may, thus, apply a first user input, such as a pinch out gesture, to the display 68, which may result in the image 10 shown in FIG. 4 being zoomed in to present the larger view of the desired viewable area (viewable area "1") as shown in FIG. 5. Upon looking at the zoomed-in portion 12 of the pre-recorded still image on the display shown in FIG. 5, the user may wonder why his brother-in-law was smiling at the moment captured in the still image or if his brother-in-law did anything else that may be interesting to see in the moments leading up to the captured still image. Thus, the user may apply a second user input to the display 68 presenting the pre-recorded still image, such as a double tap gesture. Although a double tap gesture is used as the triggering input in the example described herein, any other user input may be configured as the trigger, such as a single touch having a predefined duration of contact, a single tap, etc.

Figure 6:
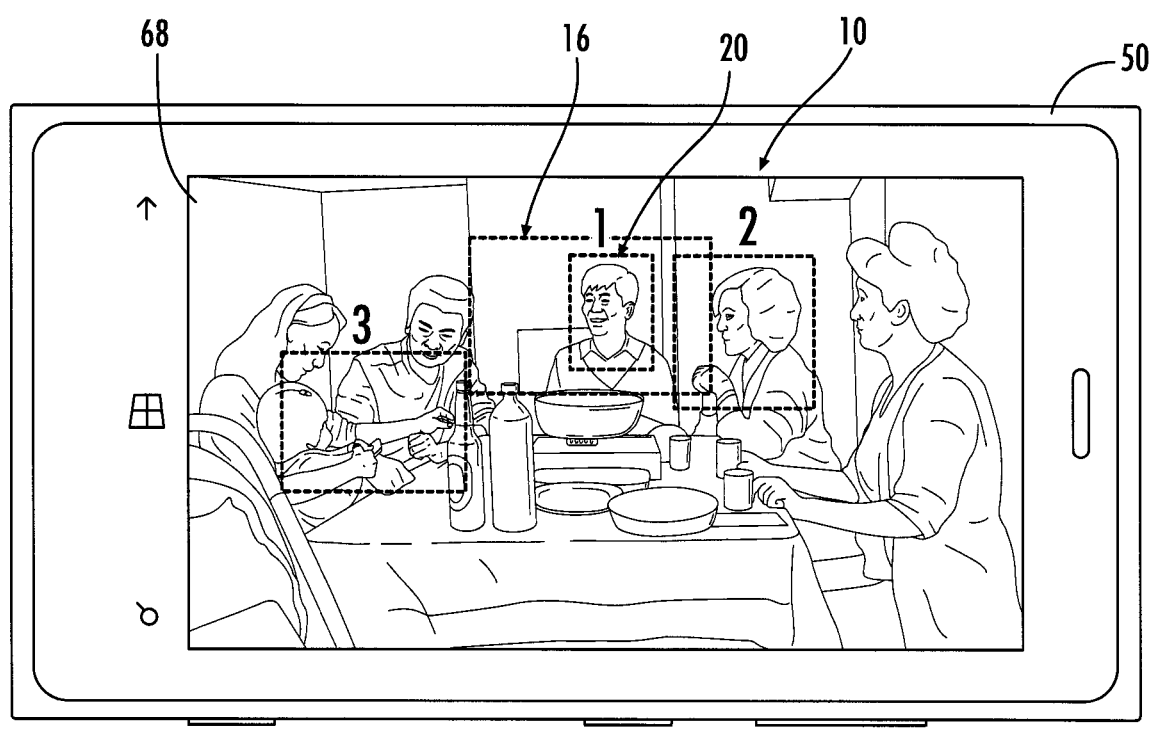
FIG. 6 illustrates the determination of an area being presented in the zoomed in image of FIG. 5 with respect to the original image of FIG. 4 for determining video clips associated with the encompassed viewable areas according to an example embodiment of the present invention.

In response to receipt of the user input (e.g., the double tap gesture), an area 16 of the pre-recorded still image that is presented on the display (e.g., the area of the original image 10 of FIG. 4 corresponding to the zoomed in portion 12 of FIG. 5) may be determined, as shown in FIG. 6. In an instance in which the area presented 16 as the zoomed-in portion is associated with a video clip of interest 40, such as when the zoomed-in portion comprises a viewable area 20 (e.g., viewable area "1" in this example) associated with a video clip of interest 40, the at least one memory and the computer program code may be configured to, with the at least one processor, cause the apparatus to cause presentation of the video clip of interest 40 that is associated with that particular zoomed-in portion or viewable area that is encompassed by the area presented 16. Thus, in the example depicted in FIG. 6, because viewable area "1" is within the area presented 16 of the zoomed in portion 12 shown in FIG. 5, the video clip 40 corresponding to that particular zoomed-in portion (e.g., viewable area 20 shown in FIG. 4) would be presented upon receipt of the second user's input (e.g., the double tap gesture) via the zoomed in portion 12 of FIG. 5. If, on the other hand, the user had zoomed in on a portion of the image 10 of FIG. 4 that does not encompass a viewable area 20 associated with a video clip of interest 40 (e.g., nothing of interest according to the pre-defined criteria happened in the zoomed in region), then no video clips would be presented to the user.

In another example, the user may apply a first user input (e.g., in the form of a pinch out gesture) to the original still image 10 shown in FIG. 4 to zoom in on a different portion of the still image, shown in FIG. 7. Upon receiving a second user input via the zoomed in portion 13 of FIG. 7, such as a double tap gesture, an area 16 of the pre-recorded still image that is presented on the display (e.g., the area of the original image 10 of FIG. 4 corresponding to the zoomed in image 13 of FIG. 7) may be determined, as shown in FIG. 8. In an instance in which the area 16 of the pre-recorded still image that is presented comprises multiple viewable areas 20 (e.g., viewable area "1" and viewable area "3" in this example) associated with multiple respective video clips of interest 40, the at least one memory and the computer program code may be configured to, with the at least one processor, cause the apparatus to cause presentation of a first video clip of interest (e.g., the video clip associated with viewable area "1") and a second video clip of interest (e.g., the video clip associated with viewable area "2"), such that the user is able to see video clips associated with each of the viewable areas encompassed by the zoomed in portion 13.

In still other embodiments, in an instance in which the zoomed-in portion of the pre-recorded still image that is presented corresponds to a maximum area of the pre-recorded still image 10 (e.g., is not actually zoomed in or is zoomed in only very slightly), the at least one memory and the computer program code may be further configured to, with the at least one processor, cause the apparatus to cause presentation of the pre-recorded video 30, in its entirety. Thus, in some embodiments, a user's input of a double tap gesture applied to the image 10 presented in FIG. 4, for example, which depicts the entire captured scene of the still image, may result in the pre-recorded video 30, in its entirety (rather than the video clips 40 extracted from the video recording) being presented to the user. Thus, in this example, a double tap gesture received as the second input via the image presented in FIG. 4 may result in the video recording 30 being presented to the user.

In some embodiments, a video clip 40 may be presented in cases where the associated viewable area 20 is fully encompassed by the zoomed-in portion presented on the display (e.g., the viewable area is shown in its entirety within the zoomed in image), as described above. In other cases, however, the associated video clip 40 may be presented in instances in which a predefined portion of the viewable area 20 is encompassed by the zoomed-in portion presented on the display. For example, if the zoomed in image being presented to the user shows more than 50% or more than 75% of a viewable area 20 (as an example), then the video clip 40 associated with that zoomed in portion (e.g., associated with that viewable area) may be presented. The threshold portion of the viewable area for showing the associated video clip may, in some cases, be configurable by the user.

FIG. 9 illustrates a flowchart of systems, methods, and computer program products according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an example embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions, and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, one example embodiment of a method for causing presentation video clips of interest to a user is shown in FIG. 9. FIG. 9 depicts an example embodiment of the method that includes causing presentation of a pre-recorded still image on a display at block 200, where the pre-recorded still image is associated with a pre-recorded video. Upon receipt of a first user input, embodiments of the method may cause presentation of a zoomed-in portion of the pre-recorded still image on the display at block 210, and upon receipt of a second user input via the zoomed-in portion of the pre-recorded still image, embodiments of the method may cause presentation of the video clip of interest associated with the zoomed-in portion of the pre-recorded still image at block 230. The video clip of interest may be a portion of the pre-recorded video in which an event occurs, as described above.

In some cases, a first video clip of interest and a second video clip of interest may be caused to be presented in an instance in which the zoomed-in portion of the pre-recorded still image is associated with the first video clip of interest and with the second video clip of interest, as described above. In an instance in which the zoomed-in portion of the pre-recorded still image that is presented corresponds to a total captured area of the pre-recorded still image, presentation of the pre-recorded video may be caused.

In some embodiments, the video clip of interest may comprise a portion of the total captured area of the pre-recorded video. Additionally or alternatively, the video clip of interest may comprise a portion of the total duration of the pre-recorded video. In some cases, the event may comprise a detected motion in the pre-recorded video meeting a predefined criterion, and in some instances the pre-defined criterion may be configurable by the user, as noted above. The pre-recorded video may be captured automatically prior to capture of the pre-recorded still image in some cases. Moreover, the second user input triggering presentation of the video clips may, as an example, comprise a double tap gesture.

In some embodiments, certain ones of the operations above may be modified or further amplified as described below. Furthermore, in some embodiments, additional optional operations may be included. Although the operations above are shown in a certain order in FIG. 9, certain operations may be performed in any order. In addition, modifications, additions, or amplifications to the operations above may be performed in any order and in any combination.

In an example embodiment, an apparatus for performing the methods of FIG. 9 above may comprise a processor (e.g., the processor 70 of FIG. 2) configured to perform some or each of the operations (200-220) described above. The processor may, for example, be configured to perform the operations (200-220) by performing hardware implemented logical functions, executing stored instructions, or executing algorithms for performing each of the operations.

Alternatively, the apparatus may comprise means for performing each of the operations described above. In this regard, according to an example embodiment, examples of means for performing operations 200-220 may comprise, for example, the processor 70, the user interface transceiver 72, the memory device 76, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:
   at least one processor; and
   at least one memory including computer program code, the at least one memory and the computer program code configured to, with the at least one processor, cause the apparatus at least to:
   generate a first video clip of interest to include a first portion of a pre-recorded video during which a first event occurs and a second video clip of interest to include a second portion of the pre-recorded video during which a second event occurs;
   present, on a display, a pre-recorded still image capturing a same scene as the pre-recorded video, wherein the pre-recorded still image comprises a frame from the pre-recorded video;
   upon receipt of a first user input, present, on the display, a zoomed-in portion of the pre-recorded still image;
   receive a second user input via the zoomed-in portion of the pre-recorded still image;
   in response to determining that the zoomed-in portion of the pre-recorded still image includes at least a threshold portion of a first viewable area of the first video clip of interest, present the first video clip of interest; and
   in response to determining that the zoomed-in portion of the pre-recorded still image includes at least the threshold portion of a second viewable area of the second video clip of interest, present the second video clip of interest, the second video clip of interest being presented prior or subsequent to the first video clip of interest in response to the zoomed-in portion of the pre-recorded still image including at least the threshold portion of the first viewable area of the first video clip as well as at least the threshold portion of the second viewable area of the second video clip of interest.

2. The apparatus according to claim 1, wherein the apparatus is further caused to at least:
   present the first video clip of interest based at least on the zoomed-in portion of the pre-recorded still image fully encompassing the first viewable area of the first video clip of interest.

3. The apparatus according to claim 1, wherein the zoomed-in portion of the pre-recorded still image includes some but not all of the first viewable area of the first video clip of interest.

4. The apparatus according to claim 1, wherein the first video clip is generated by at least detecting a motion in the pre-recorded video that meets a predefined criterion.

5. The apparatus according to claim 4, wherein the pre-defined criterion is configurable by the user.

6. The apparatus according to claim 1, wherein the pre-recorded video is captured automatically prior to capture of the pre-recorded still image.

7. The apparatus according claim 1, wherein the second user input comprises a double tap gesture.

8. A method, comprising:
   generating a first video clip of interest to include a first portion of a pre-recorded video during which a first event occurs and a second video clip of interest to include a second portion of the pre-recorded video during which a second event occurs;
   presenting, on a display, a pre-recorded still image capturing a same scene as the pre-recorded video, wherein the pre-recorded still image comprises a frame from the pre-recorded video;
   upon receipt of a first user input, presenting, on the display, a zoomed-in portion of the pre-recorded still image;
   receiving a second user input via the zoomed-in portion of the pre-recorded still image;
   determining that the zoomed-in portion of the pre-recorded still image includes at least a threshold portion of a first viewable area of the first video clip of interest and at least the threshold portion of a second viewable area of the second video clip of interest;
   in response to determining that the zoomed-in portion of the pre-recorded still image includes at least the threshold portion of the first viewable area of the first video clip of interest, presenting the first video clip of interest; and
   in response to determining that the zoomed-in portion of the pre-recorded still image includes at least the threshold portion of the second viewable area of the second video clip of interest, presenting the second video clip of interest, the second video clip of interest being presented prior or subsequent to the first video clip of interest in response to the zoomed-in portion of the pre-recorded still image including at least the threshold portion of the first viewable area of the first video clip as well as at least the threshold portion of the second viewable area of the second video clip of interest.

9. The method according to claim 8, further comprising:
   presenting the first video clip of interest based at least on the zoomed-in portion of the pre-recorded still image fully encompassing the first viewable area of the first video clip of interest.

10. The method according to claim 8, wherein the zoomed-in portion of the pre-recorded still image includes some but not all of the first viewable area of the first video clip of interest.

11. The method according to claim 8, wherein the first video clip is generated by at least detecting a motion in the pre-recorded video that meets a predefined criterion.

12. The method according to claim 11, wherein the pre-defined criterion is configurable by the user.

13. The method according to claim 8, wherein the pre-recorded video is captured automatically prior to capture of the pre-recorded still image.

14. The method according to claim 8, wherein the second user input comprises a double tap gesture.

15. A computer program product comprising a non-transitory computer readable medium having program code portions stored thereon, the program code portions configured, upon execution, to:
 generate a first video clip of interest to include a first portion of a pre-recorded video during which a first event occurs and a second video clip of interest to include a second portion of the pre-recorded video during which a second event occurs;
 present, on a display, a pre-recorded still image capturing a same scene as the pre-recorded video, wherein the pre-recorded still image comprises a frame from the pre-recorded video;
 upon receipt of a first user input, present, on the display, a zoomed-in portion of the pre-recorded still image;
 receive a second user input via the zoomed-in portion of the pre-recorded still image;
 in response to determining that the zoomed-in portion of the pre-recorded still image includes at least a threshold portion of a first viewable area of the first video clip of interest, present the first video clip of interest; and
 in response to determining that the zoomed-in portion of the pre-recorded still image includes at least the threshold portion of a second viewable area of the second video clip of interest, present the second video clip of interest, the second video clip of interest being presented prior or subsequent to the first video clip of interest in response to the zoomed-in portion of the pre-recorded still image including at least the threshold portion of the first viewable area of the first video clip as well as at least the threshold portion of the second viewable area of the second video clip of interest.

* * * * *